(12) United States Patent
Handa et al.

(10) Patent No.: US 12,280,841 B2
(45) Date of Patent: Apr. 22, 2025

(54) VEHICLE CONTROL DEVICE

(71) Applicant: TOYOTA JIDOSHA KABUSHIKI KAISHA, Toyota (JP)

(72) Inventors: Satoshi Handa, Kariya (JP); Shusaku Sugamoto, Toyota (JP); Satoshi Inoue, Anjyou (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 18/087,330

(22) Filed: Dec. 22, 2022

(65) Prior Publication Data

US 2023/0286575 A1    Sep. 14, 2023

(30) Foreign Application Priority Data

Mar. 14, 2022   (JP) ................. 2022-039306

(51) Int. Cl.
*B62D 6/00*    (2006.01)
*B62D 15/02*   (2006.01)

(52) U.S. Cl.
CPC ............. *B62D 6/00* (2013.01); *B62D 15/025* (2013.01)

(58) Field of Classification Search
CPC .................................. B62D 6/00; B62D 15/025
See application file for complete search history.

(56) References Cited

U.S. PATENT DOCUMENTS

| | | |
|---|---|---|
| 2003/0060936 A1 | 3/2003 | Yamamura et al. |
| 2005/0240328 A1 | 10/2005 | Shirato et al. |
| 2010/0138112 A1* | 6/2010 | Suzuki ................. B62D 15/025 701/42 |
| 2012/0089301 A1* | 4/2012 | Koizumi ............... B62D 6/002 701/41 |
| 2012/0296525 A1* | 11/2012 | Endo .................... B62D 5/0466 701/42 |
| 2015/0225014 A1* | 8/2015 | Takeda ................. G06V 20/588 701/41 |
| 2015/0225015 A1* | 8/2015 | Takeda .................. B62D 6/008 701/41 |

(Continued)

FOREIGN PATENT DOCUMENTS

| | | |
|---|---|---|
| JP | 2003-063430 A | 3/2003 |
| JP | 2005-306283 A | 11/2005 |

(Continued)

*Primary Examiner* — Long T Tran
(74) *Attorney, Agent, or Firm* — Sughrue Mion, PLLC (57) ABSTRACT

When it is determined that there is no possibility of a driver performing a predetermined steering operation for moving a host vehicle in a lateral direction without involving a change in a final travel direction, a vehicle control device sets a steering reaction force to be greater than a standard reaction force. When it is determined that there is a possibility thereof, the vehicle control device sets the steering reaction force to be smaller than the standard reaction force, and sets an increase rate of the steering reaction force relative to an increase in the amount of steering operation from a predetermined point in time after it is determined that there is a possibility of the driver performing the predetermined steering operation and before the amount of steering operation in the predetermined steering operation becomes largest to be higher than an increase rate before the predetermined point in time.

3 Claims, 8 Drawing Sheets

(56) References Cited

U.S. PATENT DOCUMENTS

| | | | |
|---|---|---|---|
| 2015/0274203 A1* | 10/2015 | Takeda | B62D 15/025 |
| | | | 701/42 |
| 2015/0344068 A1* | 12/2015 | Taniguchi | B62D 6/008 |
| | | | 701/41 |
| 2016/0114832 A1* | 4/2016 | Taniguchi | B62D 6/04 |
| | | | 701/41 |
| 2017/0233004 A1* | 8/2017 | Hatano | B62D 6/002 |
| | | | 701/41 |
| 2019/0367082 A1 | 12/2019 | Sugamoto et al. | |
| 2021/0402998 A1* | 12/2021 | Inoue | B60W 10/18 |
| 2022/0097758 A1* | 3/2022 | Kasai | B62D 6/008 |
| 2022/0363305 A1* | 11/2022 | Suzuki | B62D 5/046 |

FOREIGN PATENT DOCUMENTS

| | | |
|---|---|---|
| JP | 2019-209844 A | 12/2019 |
| JP | 2020-132025 A | 8/2020 |
| JP | 2021-070393 A | 5/2021 |

* cited by examiner

FIG. 10

VEHICLE CONTROL DEVICE

CROSS-REFERENCE TO RELATED APPLICATION

This application claims priority to Japanese Patent Application No. 2022-039306 filed on Mar. 14, 2022, incorporated herein by reference in its entirety.

BACKGROUND

1. Technical Field

The present disclosure relates to a vehicle control device.

2. Description of Related Art

There is a range of an appropriate amount (an appropriate range) of steering wheel operation required for a driver to cause a vehicle to travel appropriately along a curved road. In this connection, there is a known vehicle control device that, when an amount of steering wheel operation performed by a driver increases and falls within the appropriate range while the vehicle is traveling along a curved road, increases a reaction force given to the steering wheel operation performed by the driver (steering reaction force) to thereby help the amount of steering wheel operation remain within the appropriate range (see Japanese Unexamined Patent Application Publication No. 2019-209844 (JP 2019-209844 A)).

SUMMARY

The above-described vehicle control device assists the driver in steering wheel operation by adjusting the steering reaction force while the driver is making the vehicle travel along a curved road. Situations where such assistance is desired are not limited to the situation where the driver makes the vehicle travel along a curved road but also include a situation where the driver makes the vehicle travel straight forward and a situation where the driver changes the lane of the vehicle. Such situations require adjustment of the steering reaction force in a different form from adjustment of the steering reaction force while the driver is making the vehicle travel along a curved road. However, the above-described vehicle driving assistance device does not deal with adjustment of the steering reaction force in such situations, and moreover, the form of required appropriate adjustment of the steering reaction force differs also between the situation where the driver makes the vehicle travel straight forward and the situation where the driver changes the lane of the vehicle.

An object of the present disclosure is to provide a vehicle control device that can perform appropriate control of a steering reaction force in a situation where a driver moves a host vehicle in a lateral direction without involving a change in a final travel direction of the host vehicle, such as a situation where the driver makes the host vehicle travel straight forward or a situation where the driver changes the lane of the host vehicle.

A vehicle control device according to the present disclosure includes a reaction force generator that gives a steering reaction force to a steering operation performed by a driver on a host vehicle, and a controller that executes steering reaction force control of controlling the strength of the steering reaction force. The controller is configured to, during execution of the steering reaction force control, give to the steering operation a reaction force that increases as an amount of steering operation becomes larger as the steering reaction force.

Further, the controller is configured to execute, as the steering reaction force control, active steering reaction force control in which: when it is determined that there is no possibility of the driver performing a predetermined steering operation for moving the host vehicle in a lateral direction without involving a change in a final travel direction of the host vehicle, the steering reaction force is set to be greater than a standard reaction force; when it is determined that there is a possibility of the driver performing the predetermined steering operation, the steering reaction force is set to be smaller than the standard reaction force; and an increase rate of the steering reaction force relative to an increase in the amount of steering operation during a period from a predetermined point in time after it is determined that there is a possibility of the driver performing the predetermined steering operation and before the amount of steering operation in the predetermined steering operation becomes largest is set to be higher than an increase rate of the steering reaction force relative to an increase in the amount of steering operation during a period before the predetermined point in time.

According to the present disclosure, a relatively great steering reaction force is given to a steering operation when there is no possibility of the driver performing the predetermined steering operation (i.e., a steering operation for moving the host vehicle in a lateral direction without involving a change in the final travel direction of the host vehicle), such as a steering operation for changing the lane of the host vehicle (e.g., when the host vehicle is traveling straight forward). Therefore, it is made easier for the driver to perform a steering operation for maintaining a state where the host vehicle travels straight forward.

On the other hand, according to the present disclosure, only a relatively small steering reaction force is given to a steering operation when there is a possibility of the driver performing the predetermined steering operation, such as a steering operation for changing the lane of the host vehicle. Therefore, it is made easier for the driver to perform the predetermined steering operation, such as a steering operation for changing the lane of the host vehicle.

Further, according to the present disclosure, at the predetermined point in time after it is determined that there is a possibility of the driver performing the predetermined steering operation and before the amount of steering operation becomes largest, the increase rate of the steering reaction force relative to an increase in the amount of steering operation is set to be higher than the increase rate of the steering reaction force relative to an increase in the amount of steering operation before the predetermined point in time. Therefore, it is made easier for the driver to maintain the amount of steering operation at the largest amount and to reduce the amount of steering operation after the amount of steering operation becomes largest.

In the vehicle control device according to the present disclosure, the controller is configured, for example, such that when it is determined that there is a possibility of the driver performing the predetermined steering operation, the controller sets, as a target steering operation amount, an amount larger than an amount of steering operation that is specified by a pattern of change over time in the amount of steering operation to be achieved by the predetermined steering operation, and such that when an actual amount of steering operation is smaller than the target steering operation amount, the controller sets a reaction force obtained by reducing the standard reaction force as the steering reaction force and thus sets the steering reaction force to be smaller than the standard reaction force. Further, the controller is configured, for example, such that, from the predetermined point in time, the controller sets, as the target steering operation amount, an amount smaller than the amount of steering operation specified by the pattern of change, and such that when an actual amount of steering operation is larger than the target steering operation amount, the controller sets a reaction force obtained by increasing the standard reaction force as the steering reaction force, and thus sets the increase rate of the steering reaction force relative to an increase in the amount of steering operation during the period from the predetermined point in time to be higher than the increase rate of the steering reaction force relative to an increase in the amount of steering operation during the period before the predetermined point in time.

According to this, when it is determined that there is a possibility of the driver performing the predetermined steering operation, the steering reaction force is set to be smaller before the driver starts the predetermined steering operation. Thereafter, when the amount of steering operation becomes close to the largest amount, the increase rate of the steering reaction force relative to an increase in the amount of steering operation is set to be higher. Moreover, this steering reaction force is determined based on the pattern of change over time in the amount of steering operation to be achieved by the predetermined steering operation, which can increase the likelihood that the driver will perform the predetermined steering operation in such a manner that the amount of steering operation changes according to the pattern of change.

In the vehicle control device according to the present disclosure, the controller may be configured such that:

when it is determined that there is a possibility of the driver performing the predetermined steering operation while execution of the active steering reaction force control is requested by the driver, the controller executes the active steering reaction force control as the steering reaction force control; and when the predetermined steering operation is performed while execution of the active steering reaction force control is not requested by the driver, the controller executes, as the steering reaction force control, normal steering reaction force control in which the amount of steering operation specified by the pattern of change is set as the target steering operation amount, and when an actual amount of steering operation is smaller than the target steering operation amount, the steering reaction force is set to be smaller than the standard reaction force, and when the actual amount of steering operation is larger than the target steering operation amount, the steering reaction force is set to be greater than the standard reaction force.

According to this, it is possible to determine whether or not to execute the active steering reaction force control as requested by the driver.

Constituent elements of the present disclosure are not limited to those in an embodiment of the present disclosure to be described later with reference to the drawings. Other objects, other features, and accompanying advantages of the present disclosure will be easily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
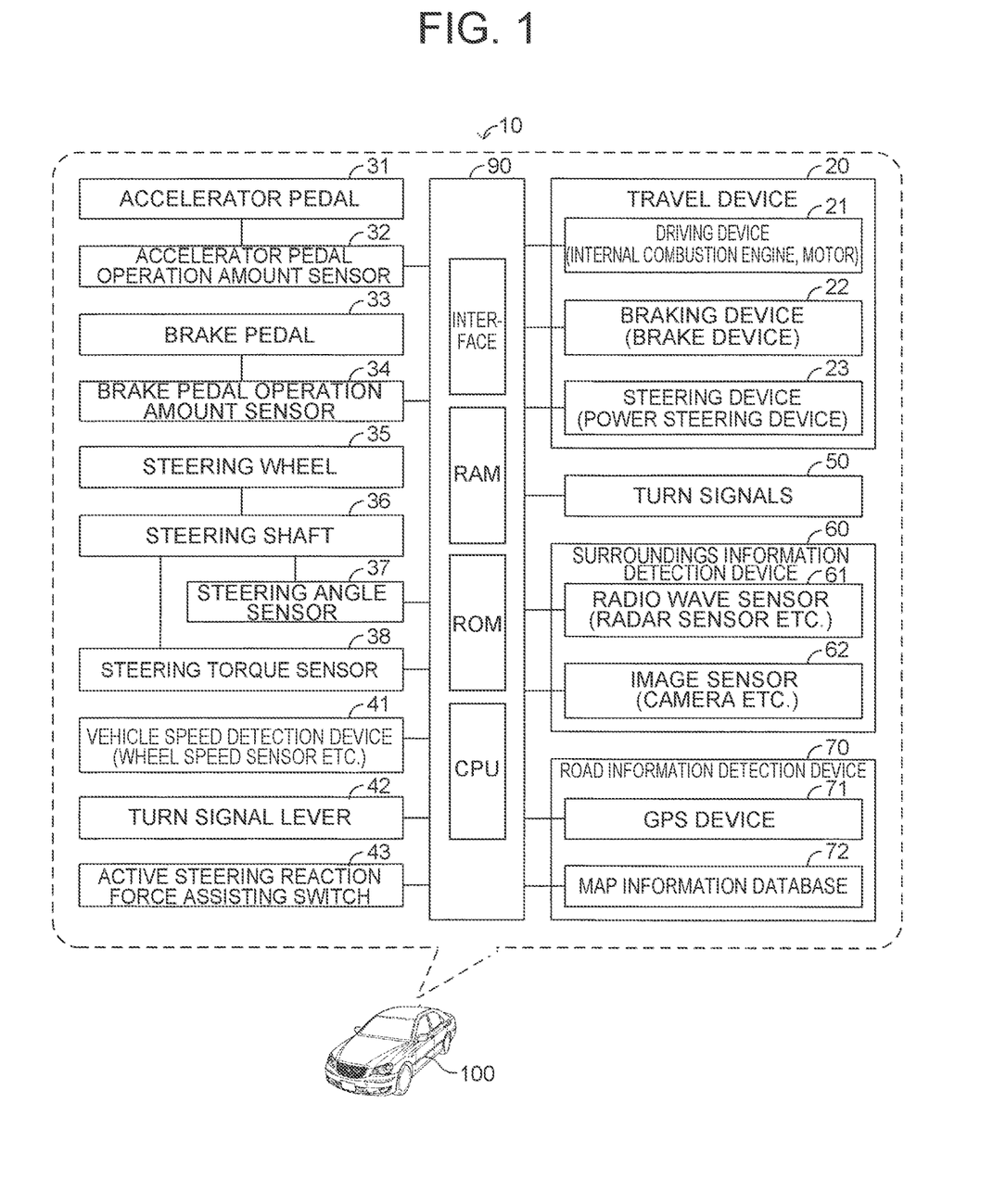
FIG. 1 is a diagram showing a vehicle control device according to an embodiment of the present disclosure and a vehicle (host vehicle) equipped with this vehicle control device.

A vehicle control device according to an embodiment of the present disclosure will be described below with reference to the drawings. As shown in FIG. 1, a vehicle control device 10 according to the embodiment of the present disclosure is installed in a host vehicle 100. In the following description, a driver of the host vehicle 100 will be referred to simply as a "driver."

ECU

The vehicle control device 10 includes an ECU 90. "ECU" stands for "electronic control unit." The ECU 90 includes a microcomputer as a main part. The microcomputer includes a CPU, an ROM, an RAM, a non-volatile memory, an interface, etc. The CPU realizes various functions by executing instructions, programs, or routines stored in the ROM.

Travel Device

The host vehicle 100 is equipped with a travel device 20. The travel device 20 includes a driving device 21, a braking device 22, and a steering device 23.

Driving Device

The driving device 21 is a device that outputs a driving torque (driving force) applied to the host vehicle 100 to cause the host vehicle 100 to travel, and is, for example, an internal combustion engine or a motor. The driving device 21 is electrically connected to the ECU 90. The ECU 90 can control the driving torque output from the driving device 21 by controlling the operation of the driving device 21.

Braking Device

The braking device 22 is a device that outputs a braking torque (braking force) applied to the host vehicle 100 to brake the host vehicle 100, and is, for example, a brake device. The braking device 22 is electrically connected to the ECU 90. The ECU 90 can control the braking torque output from the braking device 22 by controlling the operation of the braking device 22.

Steering Device

The steering device 23 is a device that outputs a steering torque (steering force) applied to the host vehicle 100 to steer the host vehicle 100, and is, for example, a power steering device. The steering device 23 is electrically connected to the ECU 90. The ECU 90 can control a steering torque and a steering reaction force, to be described alter, output from the steering device 23 by controlling the operation of the steering device 23.

Sensors

The host vehicle 100 is further equipped with an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle speed detection device 41, a turn signal lever 42, an active steering reaction force assisting switch 43, turn signals 50, a surroundings information detection device 60, and a road information detection device 70.

Accelerator Pedal Operation Amount Sensor

The accelerator pedal operation amount sensor 32 is a sensor that detects an operation amount of the accelerator pedal 31, and is electrically connected to the ECU 90. The accelerator pedal operation amount sensor 32 transmits information on a detected operation amount of the accelerator pedal 31 to the ECU 90. Based on this information, the ECU 90 acquires the operation amount of the accelerator pedal 31 as an accelerator pedal operation amount AP. The ECU 90 acquires a required driving torque (required driving force) based on the accelerator pedal operation amount AP and a travel speed of the host vehicle 100, and controls the operation of the driving device 21 such that a driving torque corresponding to that required driving torque is given from the driving device 21 to the host vehicle 100 (particularly driving wheels of the host vehicle 100).

Brake Pedal Operation Amount Sensor

The brake pedal operation amount sensor 34 is a sensor that detects an operation amount of the brake pedal 33, and is electrically connected to the ECU 90. The brake pedal operation amount sensor 34 transmits information on a detected operation amount of the brake pedal 33 to the ECU 90. Based on this information, the ECU 90 acquires the operation amount of the brake pedal 33 as a brake pedal operation amount BP. The ECU 90 acquires a required braking torque (required braking force) based on the brake pedal operation amount BP, and controls the operation of the braking device 22 such that a braking torque corresponding to that required braking torque is given from the braking device 22 to the host vehicle 100 (particularly wheels of the host vehicle 100).

Steering Angle Sensor

The steering angle sensor 37 is a sensor that detects a rotation angle of the steering shaft 36 relative to a neutral position, and is electrically connected to the ECU 90. The steering angle sensor 37 transmits information on a detected rotation angle of the steering shaft 36 to the ECU 90. Based on this information, the ECU 90 acquires the rotation angle of the steering shaft 36 as a steering angle $\theta$.

Steering Torque Sensor

The steering torque sensor 38 is a sensor that detects a torque that the driver has input into the steering shaft 36 through the steering wheel 35, and is electrically connected to the ECU 90. The steering torque sensor 38 transmits information on a detected torque to the ECU 90. Based on this information, the ECU 90 acquires the torque that the driver has input into the steering shaft 36 through the steering wheel 35 as a driver-input torque.

The ECU 90 acquires a required steering torque based on the steering angle $\theta$, the driver-input torque, and the travel speed of the host vehicle 100, and controls the operation of the steering device 23 such that a steering torque corresponding to that required steering torque is given from the steering device 23 to the host vehicle 100 (particularly turning wheels of the host vehicle 100), and such that a reaction force corresponding to a target steering reaction force RFtgt that is set as will be described later is given to the steering wheel 35 (a steering wheel operation of by the driver). In this example, therefore, the steering device 23 includes a reaction force generator that gives a steering reaction force to a steering wheel operation (steering operation) performed on the host vehicle 100 by the driver.

Vehicle Speed Detection Device

The vehicle speed detection device 41 is a device that detects the travel speed of the host vehicle 100, and is, for example, a wheel speed sensor. The vehicle speed detection device 41 is electrically connected to the ECU 90. The vehicle speed detection device 41 transmits information on a detected travel speed of the host vehicle 100 to the ECU 90. Based on this information, the ECU 90 acquires the travel speed of the host vehicle 100 as a host vehicle speed V100.

Turn Signal Lever

The turn signal lever 42 is a lever that is operated by the driver to activate the turn signals 50, and is electrically connected to the ECU 90. When the turn signal lever 42 is operated from a neutral position to a right-turn position, the ECU 90 activates (flashes) the turn signals 50 provided at a right front-side corner part and a right rear-side corner part of the host vehicle 100. On the other hand, when the turn signal lever 42 is operated from the neutral position to a left-turn position, the ECU 90 activates (flashes) the turn signals 50 provided at a left front-side corner part and a left rear-side corner part of the host vehicle 100.

Active Steering Reaction Force Assisting Switch

The active steering reaction force assisting switch 43 is a switch that is operated by the driver to request execution of active steering reaction force control to be described later, and is electrically connected to the ECU 90. When the active steering reaction force assisting switch 43 is operated and set to an on-position, the ECU 90 determines that execution of the active steering reaction force control has been requested.

Surroundings Information Detection Device

The surroundings information detection device 60 is a device that detects information on the surroundings of the host vehicle 100, and includes a radio wave sensor 61 and an image sensor 62 in this example. The radio wave sensor 61 is, for example, a radar sensor (millimeter-wave radar etc.). The image sensor 62 is, for example, a camera. The surroundings information detection device 60 may include a sound wave sensor, such as an ultrasonic sensor (clearance sonar), or an optical sensor, such as a laser radar (LiDAR).

Radio Wave Sensor

The radio wave sensor 61 is electrically connected to the ECU 90. The radio wave sensor 61 transmits radio waves and receives radio waves reflected by an object (reflected waves). The radio wave sensor 61 transmits information (detection result) on transmitted radio waves and received radio waves (reflected radio waves) to the ECU 90. In other words, the radio wave sensor 61 detects an object present around the host vehicle 100 and transmits information (detected result) on the detected object to the ECU 90. Based on this information (radio wave information), the ECU 90 acquires information on an object present around the host vehicle 100 as surroundings detection information IS. In this example, objects are vehicles, motorcycles, bicycles, persons, etc.

Image Sensor

The image sensor 62 is also electrically connected to the ECU 90. The image sensor 62 captures images of the surroundings of the host vehicle 100 and transmits information on the captured images to the ECU 90. Based on this information (camera image information), the ECU 90 acquires information about the surroundings of the host vehicle 100 as the surroundings detection information IS.

Road Information Detection Device

The road information detection device 70 includes a GPS device 71 and a map information database 72.

GPS Device

The GPS device 71 is a device that receives so-called GPS signals, and is electrically connected to the ECU 90. The ECU 90 acquires GPS signals through the GPS device 71. Based on the acquired GPS signals, the ECU 90 can acquire a current position P100 of the host vehicle 100.

Map Information Database

The map information database 72 is a database that stores map information including information about roads etc., and is electrically connected to the ECU 90. The ECU 90 acquires information about a road on which the host vehicle 100 is currently traveling and other pieces of information from the current position P100 of the host vehicle 100 as road information IR.

Overview of Operation of Vehicle Control Device

Next, an overview of the operation of the vehicle control device 10 will be described.

Normal Steering Reaction Force Control

When execution of the active steering reaction force control is not requested, the vehicle control device 10 executes normal steering reaction force control as steering reaction force control of controlling a reaction force (steering reaction force) for an operation performed by the driver on the steering wheel 35 (a steering wheel operation, a steering operation).

The normal steering reaction force control is control of setting a target value of the steering reaction force (target steering reaction force RFtgt) based on the steering angle θ (an amount of steering operation) and giving a steering reaction force (normal steering reaction force) corresponding to that target steering reaction force RFtgt to a steering wheel operation. More specifically, the normal steering reaction force control is control of giving to a steering wheel operation a steering reaction force (normal steering reaction force) that becomes greater as the steering angle θ becomes larger.

Figure 2:
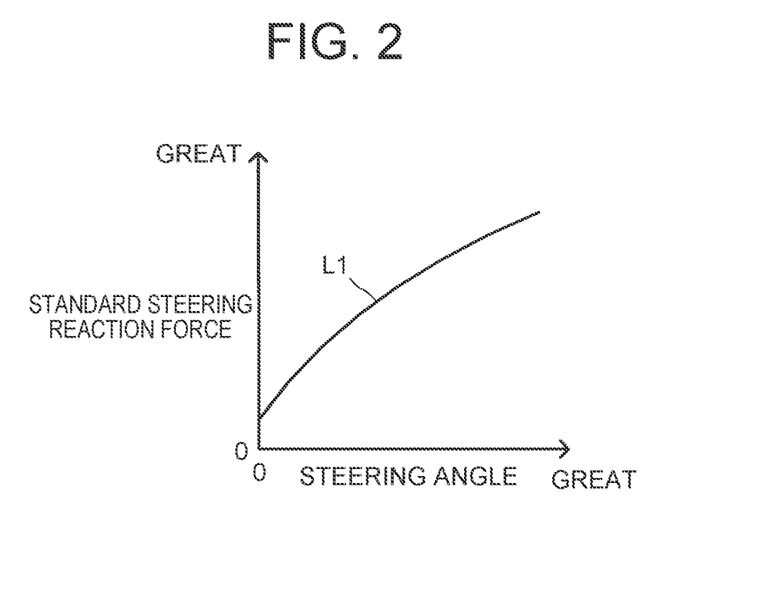
FIG. 2 is a graph showing a look-up table specifying a relationship between a steering angle and a standard steering reaction force in normal steering reaction force control.

The vehicle control device 10 stores a look-up table specifying a relationship between the steering angle θ and the target steering reaction force RFtgt as indicated by the solid line L1 in FIG. 2 as a look-up table used for setting the target steering reaction force RFtgt in the normal steering reaction force control. During execution of the normal steering reaction force control, the vehicle control device 10 acquires a steering reaction force (standard steering reaction force RFb) to be given to the steering wheel 35 (steering wheel operation) by applying the steering angle θ to this look-up table, sets that standard steering reaction force RFb as the target steering reaction force RFtgt, and controls the operation of the steering device 23 such that a steering reaction force (normal steering reaction force) corresponding to that target steering reaction force RFtgt is given from the steering device 23 to the steering wheel 35.

When a force that rotates the steering wheel 35 clockwise (rightward) is applied to the steering wheel 35 by the driver, the operation of the steering device 23 is controlled such that a force that rotates the steering wheel 35 counterclockwise (leftward) is applied to the steering wheel 35 as the steering reaction force, and when a force that rotates the steering wheel 35 counterclockwise (leftward) is applied to the steering wheel 35 by the driver, the operation of the steering device 23 is controlled such that a force that rotates the steering wheel 35 clockwise (rightward) is applied to the steering wheel 35 as the steering reaction force.

The vehicle control device 10 may be configured to, instead of acquiring the standard steering reaction force RFb using the look-up table shown in FIG. 2, acquire the standard steering reaction force RFb using an arithmetic expression specifying a relationship between the steering angle θ and the standard steering reaction force RFb. In this case, the vehicle control device 10 acquires (calculates) the standard steering reaction force RFb by applying the steering angle θ to the arithmetic expression.

Active Steering Reaction Force Control

Figure 3:
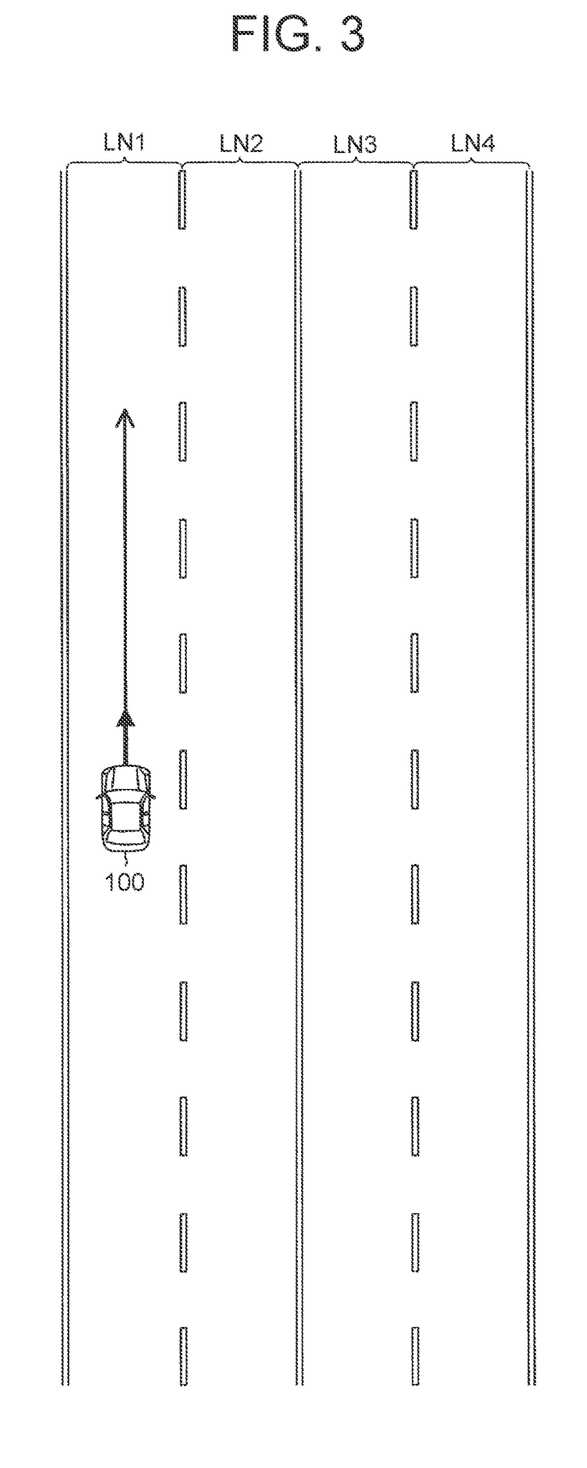
FIG. 3 is a view showing a situation where a host vehicle is traveling straight forward.

On the other hand, when execution of the active steering reaction force control is requested, the vehicle control device 10 executes the active steering reaction force control as the steering reaction force control. In this case, when it is determined that there is no possibility of the driver changing the lane of the host vehicle 100 (lane-change execution possibility), i.e., when it is inferred that the driver is trying to make the host vehicle 100 travel along a straight road (travel straight forward) as shown in FIG. 3, the vehicle control device 10 executes active straight-forward steering reaction force control as the active steering reaction force control. On the other hand, when it is determined that there is a possibility of the driver changing the lane of the host vehicle 100 (lane-change execution possibility) as shown in FIG. 4, the vehicle control device 10 executes active lane-change steering reaction force control as the active steering reaction force control.

Figure 4:
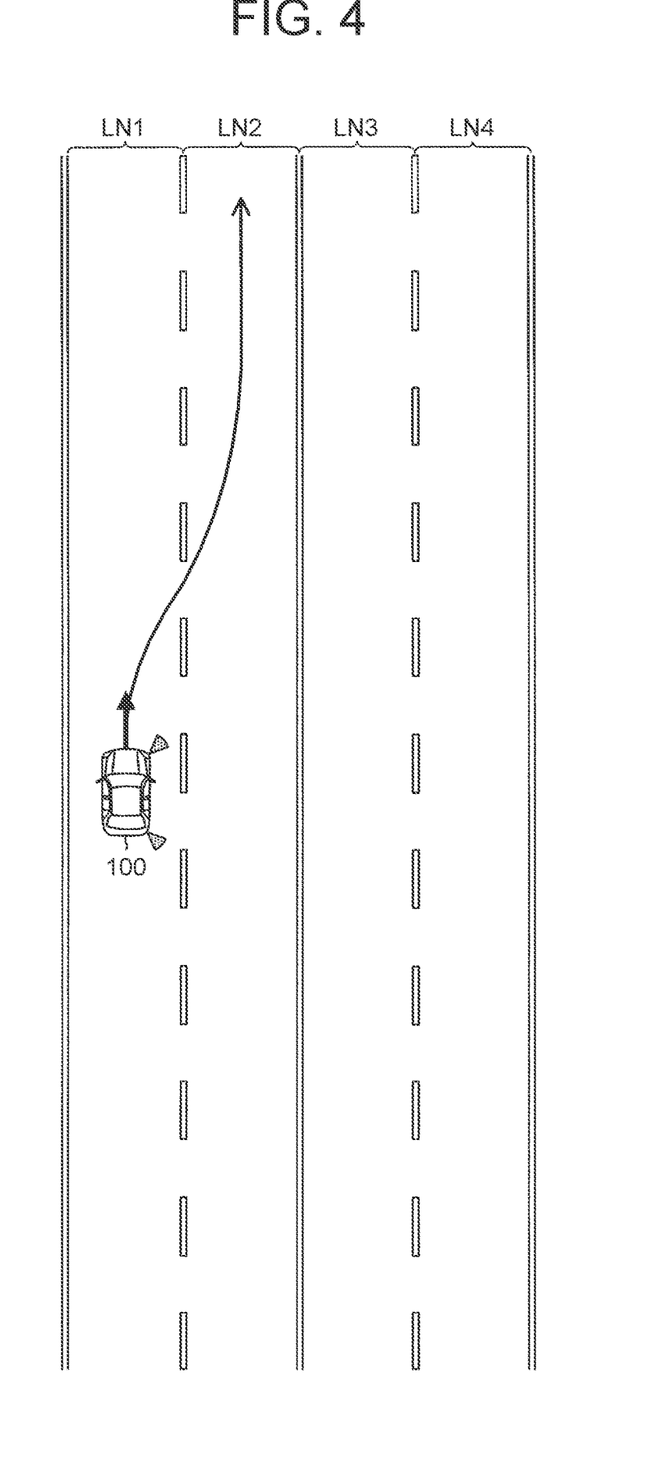
FIG. 4 is a view showing a situation where the host vehicle changes lanes.

In FIG. 3 and FIG. 4, the lane indicated by reference sign LN2 is a lane (right adjacent same-direction lane) which is provided adjacently to the right of an own lane LN1 and in which the travel direction of vehicles is the same as the travel direction of vehicles in the own lane LN1. The lanes indicated by reference sign LN3 and reference sign LN4 are respectively opposing lanes for the own lane LN1 and the right adjacent same-direction lane LN2.

In the following, the operation of the vehicle control device 10 will be described using, as an example of situations where the driver changes the lane of the host vehicle 100, a situation where the driver makes the host vehicle 100 move from the own lane LN1 (the lane in which the host vehicle 100 is currently traveling) into a right adjacent same-direction lane (a lane in which the travel direction is the same as the travel direction in the own lane LN1 and which is located adjacently to the right of the own lane LN1). Other examples of situations where the driver changes the lane of the host vehicle 100 include a situation where the driver changes the lane of the host vehicle 100 from the own lane LN1 to a left adjacent same-direction lane (a lane in which the travel direction is the same as the travel direction in the own lane LN1 and which is located adjacently to the left of the own lane LN1), a situation where the driver makes the host vehicle 100 enter a main lane of an expressway from a gently curved road leading to the main lane of the expressway, and a situation where the driver makes the host vehicle 100 enter a right-turn-only lane from the own lane LN1.

Further, examples of situations where the host vehicle 100 behaves similarly to when changing lanes include a situation where the host vehicle 100 moves close to a side of a road (a side of the own lane LN1) as an emergency vehicle, such as an ambulance, approaches the host vehicle 100, and the vehicle control device 10 is also applicable to such situations. Thus, the vehicle control device 10 is applicable not only to a situation where travel of the host vehicle 100 involving a lateral movement, such as a right or left turn, is performed in which the host vehicle 100 is turned by a steering wheel operation and a change in the final travel direction of the host vehicle 100 is involved, but also to a situation where travel of the host vehicle 100 is performed in which the host vehicle 100 is turned by a steering wheel operation but the host vehicle 100 is moved in a lateral direction without involving a change in the final travel direction of the host vehicle 100.

In this example, the vehicle control device 10 determines that there is a lane-change execution possibility when the turn signals 50 are activated and there is an adjacent same-direction lane in the turning direction of the host vehicle 100 indicated by the turn signals 50, and determines that there is no lane-change execution possibility when this is not the case. Here, an adjacent same-direction lane is a lane which is adjacent to the own lane LN1 and in which the travel direction of vehicles is the same as the travel direction of vehicles in the own lane LN1. In the example shown in FIG. 4, since the turning direction of the host vehicle 100 indicted by the turn signals 50 is the right turning direction, the adjacent same-direction lane is the right adjacent same-direction lane LN2. Whether there is an adjacent same-direction lane in the turning direction of the host vehicle 100 indicated by the turn signals 50 is determined based on the surroundings detection information IS and/or the road information IR.

The vehicle control device 10 may be configured to determine whether there is a lane-change execution possibility by a method other than the above-described method.

For example, the vehicle control device 10 may be configured to determine that there is a lane-change execution possibility when the number of times of an action of the driver checking a side mirror or a rearview mirror of the host vehicle 100 has increased, and to determine that there is no lane-change execution possibility when this is not the case. In this case, whether the number of times of the action of the driver checking the side mirror or the rearview mirror of the host vehicle 100 has increased is determined based on images captured by a camera (so-called driver monitoring camera) that is installed at such a position as to be able to image at least the upper body of the driver.

Or the vehicle control device 10 may be configured to determine that there is a lane-change execution possibility when a vehicle ahead that is traveling at a speed considerably lower than the host vehicle speed V100 has appeared, and to determine that there is no lane-change execution possibility when this is not the case. In this case, whether a vehicle ahead traveling at a speed considerably lower than the host vehicle speed V100 has appeared is determined based on the surroundings detection information IS.

Active Straight-Forward Steering Reaction Force Control

As with the normal steering reaction force control, the active straight-forward steering reaction force control is control of setting a target value of the steering reaction force (target steering reaction force RFtgt) based on the steering angle θ and giving a steering reaction force (active straight-forward steering reaction force) corresponding to that target steering reaction force RFtgt to the steering wheel 35 (steering wheel operation). More specifically, the active straight-forward steering reaction force control is control of giving to the steering wheel 35 a steering reaction force (active straight-forward steering reaction force) that becomes greater as the steering angle θ becomes larger. When the steering angle θ is the same, the steering reaction force given by the active straight-forward steering reaction force control (active straight-forward steering reaction force) is greater than the steering reaction force given by the normal steering reaction force control (normal steering reaction force).

Specifically, the vehicle control device 10 is configured to set the steering reaction force to be greater when execution of the active steering reaction force control is requested and it is determined that there is no lane-change execution possibility, than when execution of the active steering reaction force control is not requested.

Figure 5A:
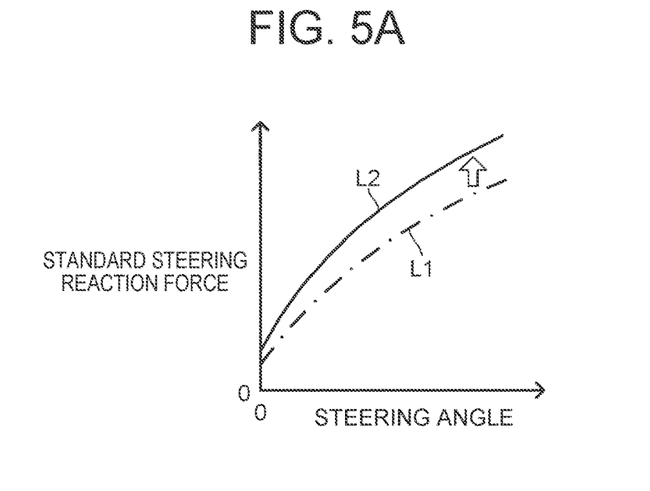
FIG. 5A is a graph showing a look-up table specifying a relationship between the steering angle and the standard steering reaction force in active straight-forward steering reaction force control.

The vehicle control device 10 stores a look-up table specifying a relationship between the steering angle θ and the standard steering reaction force RFb as indicated by the solid line L2 in FIG. 5A as a look-up table used for setting the target steering reaction force RFtgt when execution of the active steering reaction force control is requested. During execution of the active straight-forward steering reaction force control, the vehicle control device 10 acquires a standard value of the steering reaction force (the standard steering reaction force RFb, the standard reaction force) to be given to the steering wheel 35 (steering wheel operation) by applying the steering angle θ to this look-up table, sets that standard steering reaction force RFb as the target steering reaction force RFtgt, and controls the operation of the steering device 23 such that a steering reaction force (active straight-forward steering reaction force) corresponding to that target steering reaction force RFtgt is given from the steering device 23 to the steering wheel 35. The dotted-dashed line L1 in FIG. 5A is a line indicating a relationship between the steering angle θ and the standard steering reaction force RFb used for setting the target steering reaction force RFtgt during execution of the normal steering reaction force control (e.g., the relationship shown in FIG. 2).

According to this, it is made difficult for the driver to increase the amount of steering wheel operation compared with when the normal steering reaction force control is executed, which helps the driver keep the amount of steering wheel operation at near zero and maintain the rotation position of the steering wheel 35 for causing the host vehicle 100 to travel straight forward.

The vehicle control device 10 may be configured to, instead of acquiring the standard steering reaction force RFb using the look-up table shown in FIG. 5A, acquire the standard steering reaction force RFb using an arithmetic expression specifying a relationship between the steering angle θ and the standard steering reaction force RFb. In this case, the vehicle control device 10 acquires (calculates) the standard steering reaction force RFb by applying the steering angle θ to the arithmetic expression.

Active Lane-Change Steering Reaction Force Control

The active lane-change steering reaction force control is control of setting a target value of the steering reaction force (target steering reaction force RFtgt) based on the steering angle θ and a steering angle difference Δθ and giving a steering reaction force (active lane-change steering reaction force) corresponding to that target steering reaction force RFtgt to the steering wheel 35 (steering wheel operation). More specifically, the active lane-change steering reaction force control is control of giving a steering reaction force (active lane-change steering reaction force) of a value that is set as will be described below to the steering wheel 35.

Figure 5B:
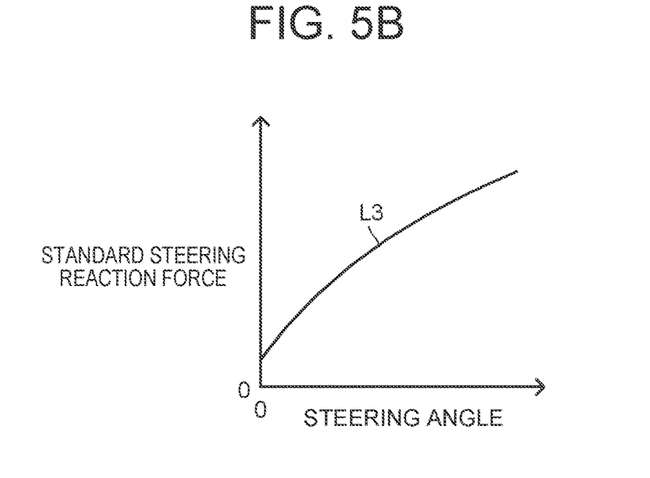
FIG. 5B is a graph showing a look-up table specifying a relationship between the steering angle and the standard steering reaction force in active lane-change steering reaction force control.

The vehicle control device 10 stores a look-up table specifying a relationship between the steering angle θ and the standard steering reaction force RFb as indicated by the solid line L3 in FIG. 5B as a look-up table used for setting the target steering reaction force RFtgt in the active lane-change steering reaction force control. During execution of the active lane-change steering reaction force control, the vehicle control device 10 acquires a standard value of the steering reaction force (the standard steering reaction force RFb, the standard reaction force) to be given to the steering wheel 35 (steering wheel operation) by applying the steering angle θ to this look-up table.

In this example, the look-up table shown in FIG. 5B that is used to acquire the standard steering reaction force RFb in the active lane-change steering reaction force control is the same as the look-up table shown in FIG. 2 that is used to acquire the standard steering reaction force RFb in the normal steering reaction force control. However, the look-up table shown in FIG. 5A may differ from the look-up table shown in FIG. 2, provided that the standard steering reaction force RFb acquired from the latter is equal to or smaller than the standard steering reaction force RFb acquired from the former at the same steering angle θ.

Figure 5C:
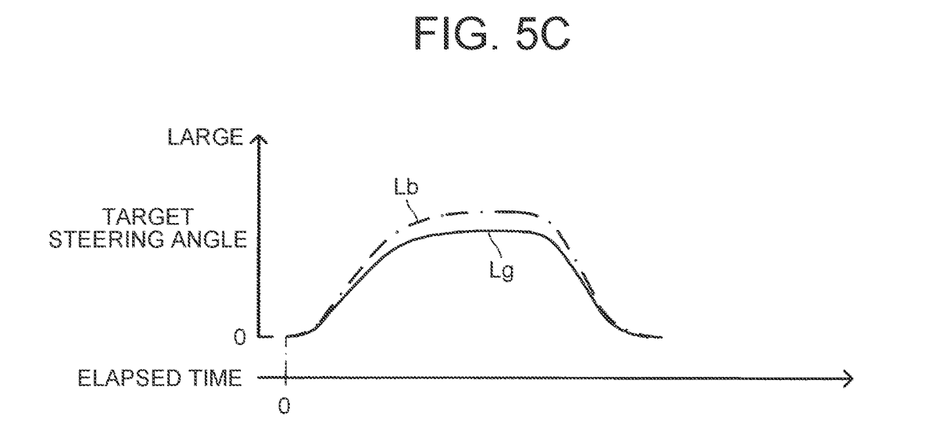
FIG. 5C is a graph showing a look-up table specifying a relationship between an elapsed time and a target steering angle in the active lane-change steering reaction force control.

Further, the vehicle control device 10 stores a look-up table specifying a relationship between a time that has elapsed (elapsed time T) from a predetermined point in time (lane-change execution determination time point tLC) and a target steering angle θtgt (target steering operation amount) as indicated by the solid line Lg in FIG. 5C as a look-up table used for setting the target steering reaction force RFtgt in the active lane-change steering reaction force control. During execution of the active lane-change steering reaction force control, the vehicle control device 10 acquires the target steering angle θtgt by applying the elapsed time T to this look-up table, acquires the difference between the actual steering angle θ at that point in time and the target steering angle θtgt as the steering angle difference Δθ, and acquires a steering reaction force corresponding to that steering angle difference Δθ as a steering reaction force adjustment value RFa. In this case, when the steering angle difference Δθ is larger, the vehicle control device 10 acquires a steering reaction force of a larger value as the steering reaction force adjustment value RFa.

Here, when the actual steering angle is smaller than the target steering angle θtgt, the steering reaction force adjustment value RFa of a positive value is acquired. When the actual steering angle is larger than the target steering angle θtgt, the steering reaction force adjustment value RFa of a negative value is acquired. When the actual steering angle is equal to the target steering angle θtgt, the steering reaction force adjustment value RFa acquired is zero.

The lane-change execution determination time point tLC is a point in time when the vehicle control device 10 determines that there is a lane-change execution possibility.

The vehicle control device 10 sets a value obtained by subtracting the steering reaction force adjustment value RFa from the standard steering reaction force RFb acquired as described above as the target steering reaction force RFtgt (RFtgt=RFb−RFa), and causes a steering reaction force (active lane-change steering reaction force) corresponding to that target steering reaction force RFtgt to be output from the steering device 23 to the steering wheel 35. Therefore, when the actual steering angle is smaller than the target steering angle θtgt, the target steering reaction force RFtgt is set to a value smaller than the standard steering reaction force RFb, and when the actual steering angle is larger than the target steering angle θtgt, the target steering reaction force RFtgt is set to a value larger than the standard steering reaction force RFb.

In FIG. 5C, the dotted-dashed line Lb indicates a standard steering angle profile Pb, and in this example, a guide steering angle profile Pg is set based on the standard steering angle profile Pb.

The standard steering angle profile Pb is a pattern of change over time in the steering angle θ (the amount of steering wheel operation, the amount of steering operation) to be achieved when the lane of the vehicle is changed to an adjacent same-direction lane, and is, for example, a pattern of change in the steering angle when the driver of the host vehicle 100 has changed the lane of the host vehicle 100 in the past, or a pattern of change in the steering angle when a driver having high driving skills changes the lane of the vehicle, or a pattern of change in the target steering angle set by a control program or the like that allows the vehicle control device 10 to autonomously change the lane of the host vehicle 100.

As shown in FIG. 5C, the guide steering angle profile Pg is obtained by shrinking the standard steering angle profile Pb as a whole such that the target steering angle θtgt acquired from the guide steering angle profile Pg becomes smaller than the steering angle θ acquired from the standard steering angle profile Pb at the same elapsed time T.

When it is determined that there is a lane-change execution possibility while execution of the active steering reaction force control is requested, the vehicle control device 10 stops the active straight-forward steering reaction force control and starts the active lane-change steering reaction force control at a point in time when a predetermined time (control start time Tstart) has elapsed from the point in time of determination.

In this example, the control start time Tstart is set to a time shorter by a predetermined time (early control time Ta) than a time that is estimated as a time taken for the driver to actually start a steering wheel operation for changing the lane of the host vehicle 100 (predetermined steering operation) after it is determined that there is a lane-change execution possibility.

Figure 6:
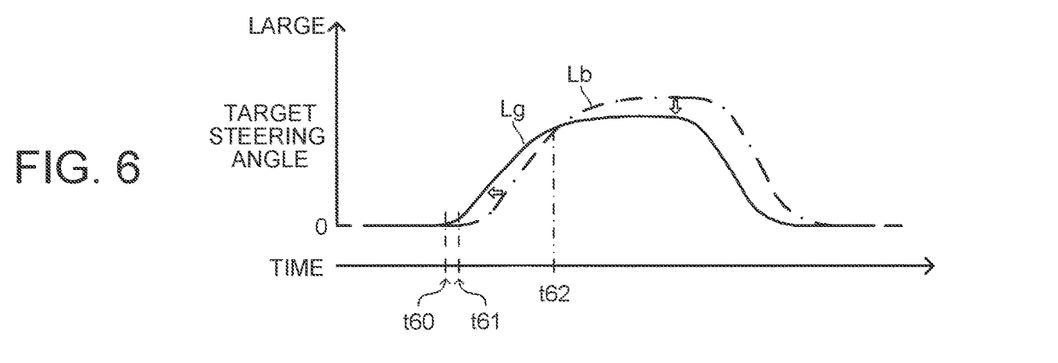
FIG. 6 is a graph showing changes in the target steering angle relative to time in the active lane-change steering reaction force control.

In this example, therefore, as shown in FIG. 6, when setting the target steering angle θtgt based on the standard steering angle profile Pb, the setting is started at time t61, and when setting the target steering angle θtgt based on the guide steering angle profile Pg, the setting is started at time t60, earlier than time t61. In other words, setting of the target steering angle θtgt based on the guide steering angle profile Pg is started at an earlier timing than setting of the target steering angle θtgt based on the standard steering angle profile Pb. In still other words, when setting the target steering angle θtgt based on the guide steering angle profile Pg, the target steering angle θtgt becomes larger than zero at an earlier timing than when setting the target steering angle θtgt based on the standard steering angle profile Pb.

The target steering angle θtgt set based on the guide steering angle profile Pg becomes smaller than the target steering angle θtgt set based on the standard steering angle profile Pb after time t62 that is later than time t60 at which setting of the target steering angle θtgt based on the guide steering angle profile Pg is started and that is later by a predetermined time than time t61 at which setting of the target steering angle θtgt based on the standard steering angle profile Pb is started.

As has been described above, according to the vehicle control device 10, unless it is determined that there is a lane-change execution possibility, i.e., as long as the driver causes the host vehicle 100 to travel straight forward, a relatively great steering reaction force is given to the steering wheel 35 (steering wheel operation). Therefore, it is made easier for the driver to maintain the steering wheel 35 at the neutral position to cause the host vehicle 100 to travel straight forward.

Figure 7A:
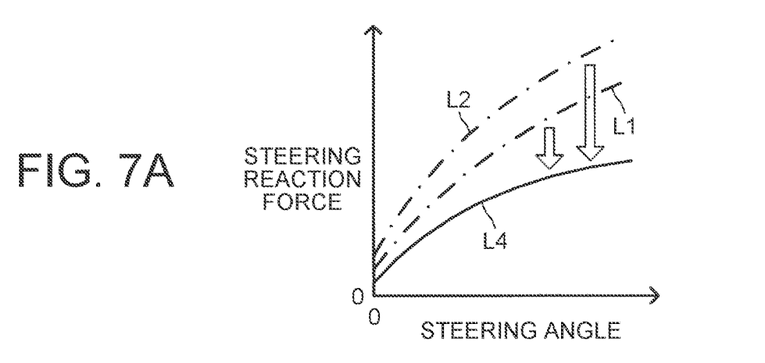
FIG. 7A is a graph showing a relationship between the steering angle and the steering reaction force during a first half period of a lane change of the host vehicle.

Further, when it is determined that there is a lane-change execution possibility, setting of the target steering angle θtgt based on the guide steering angle profile Pg is started (the target steering angle θtgt becomes larger than zero) before the driver starts a steering wheel operation for changing the lane of the host vehicle 100. Therefore, when compared at the same steering angle, the steering reaction force (active lane-change steering reaction force) indicated by the solid line L4 in FIG. 7A is smaller than the steering reaction force output by the normal steering reaction force control (normal steering reaction force) indicated by the dotted-dashed line L1 in FIG. 7A, and of course, is smaller than the steering reaction force output by the active straight-forward steering reaction force control (active straight-forward steering reaction force) indicated by the dotted-dashed line L2 in FIG. 7A. Thus, even before the driver starts a steering wheel operation for changing the lane of the host vehicle 100, the steering reaction force is set to be smaller, which helps the driver smoothly perform the steering wheel operation.

When changing the lane of the host vehicle 100, the driver operates the steering wheel 35 as follows. When changing the lane of the host vehicle 100, the driver gradually increases the amount of operation of the steering wheel 35 (steering wheel operation), and when the steering angle θ (amount of steering operation) becomes largest (the steering angle θ reaches a maximum steering angle θmax), the driver maintains the steering wheel 35 at the position at that point in time. When the host vehicle 100 has entered an adjacent same-direction lane, the driver gradually reduces the amount of steering wheel operation, and when the steering wheel 35 reaches the neutral position and the steering angle θ becomes zero and the host vehicle 100 starts traveling straight forward, the driver maintains the steering wheel 35 at the neutral position.

Figure 7B:
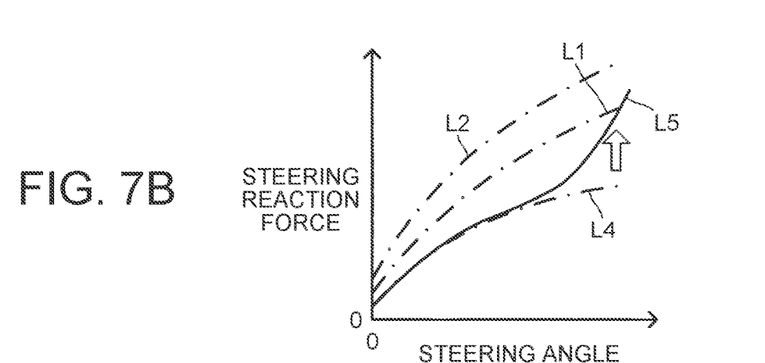
FIG. 7B is a graph showing a relationship between the steering angle and the steering reaction force during a last half period of a lane change of the host vehicle.

In the case where the driver thus operates the steering wheel 35 to change the lane of the host vehicle 100, according to the vehicle control device 10, during the period after the driver starts the steering wheel operation and before a predetermined time elapses, a steering reaction force according to the relationship indicated by the solid line L4 in FIG. 7A is given to the steering wheel 35 (steering wheel operation) according to the steering angle θ, and when the predetermined time has elapsed, a steering reaction force according to the relationship indicated by the solid line L5 in FIG. 7B is given to the steering wheel 35 (steering wheel operation) according to the steering angle θ.

Thus, after the driver starts a steering wheel operation, when the steering angle θ becomes close to the maximum steering angle θmax and the predetermined time elapses, the increase rate of the steering reaction force relative to an increase in the amount of steering wheel operation becomes higher. Therefore, it is made easier for the driver to maintain the steering wheel 35 when the steering angle θ reaches the maximum steering angle θmax. Moreover, it is made easier for the driver to operate the steering wheel 35 to the neutral position after the host vehicle 100 has entered the adjacent same-direction lane.

Further, when it is determined that there is a lane-change execution possibility, the steering reaction force is set to be smaller before the driver starts a steering wheel operation for changing the lane of the host vehicle 100 (predetermined steering operation), and thereafter, when the steering angle becomes close to the maximum steering angle θmax, the increase rate of the steering reaction force (target steering angle θtgt) relative to an increase in the steering angle is set to be higher. Moreover, this steering reaction force (target steering angle θtgt) is determined based on the pattern of change over time in the steering angle to be achieved in a lane change of the host vehicle 100 (standard steering angle profile Pb), which can increase the likelihood that the driver will perform the steering wheel operation for changing the lane of the host vehicle 100 (predetermined steering operation) in such a manner that the steering angle changes according to the pattern of change (standard steering angle profile Pb).

The vehicle control device 10 may be configured to, instead of acquiring the target steering angle θtgt using the look-up table shown in FIG. 5C, acquire the target steering angle θtgt using arithmetic expressions shown in the following Formula 1, Formula 2, and Formula 3.

$$\theta tgt = \text{MAX}(A \cdot \sin(\omega \cdot (t+\phi)), 0) \quad (1)$$

$$A = \theta\max \cdot K1 \quad (2)$$

$$\phi = T \cdot K2 \quad (3)$$

In Formula 1, "MAX" is a MAX function. In Formula 1, "A" is calculated from Formula 2. In Formula 2, "θmax" is a maximum steering angle in the standard steering angle profile Pb, and "K1" is a constant set to a predetermined value smaller than "1." In Formula 1, "ϕ" is calculated from Formula 3. In Formula 3, "T" is a time estimated as a time taken for the driver to start the steering wheel operation for changing the lane of the host vehicle 100 from the lane-change execution determination time point tLC (a point in time when it is determined that there is a lane-change execution possibility), and "K2" is a constant set to a predetermined value larger than "0."

In this case, the vehicle control device 10 acquires (calculates) the target steering angle θtgt from Formula 1 to Formula 3 using the elapsed time T as a variable.

When it is determined that there is a lane-change execution possibility during execution of the normal steering reaction force control, the target steering angle θtgt may be acquired from the standard steering angle profile Pb, and the difference between the actual steering angle θ at that point in time and the target steering angle θtgt may be acquired as the steering angle difference Δθ, and a steering reaction force corresponding to that steering angle difference Δθ may be acquired as the steering reaction force adjustment value RFa. Also in this case, when the steering angle difference Δθ is larger, the vehicle control device 10 acquires a steering reaction force of a larger value as the steering reaction force adjustment value RFa. In the case where the steering reaction force adjustment value RFa is thus acquired, when the target steering angle θtgt acquired from the standard steering angle profile Pb is calculated from the above Formula 1, constant K1 is set to "1" and constant K2 is set to "0."

Specific Operation of Vehicle Control Device

Next, the specific operation of the vehicle control device 10 will be described. The CPU of the ECU 90 of the vehicle control device 10 executes the routine shown in FIG. 8 on a predetermined arithmetic operation cycle. Therefore, when a predetermined timing comes, the CPU starts from the processing of step 800 of the routine shown in FIG. 8 and moves to the processing of step 805, where it determines whether execution of the active steering reaction force control is requested.

Figure 9:
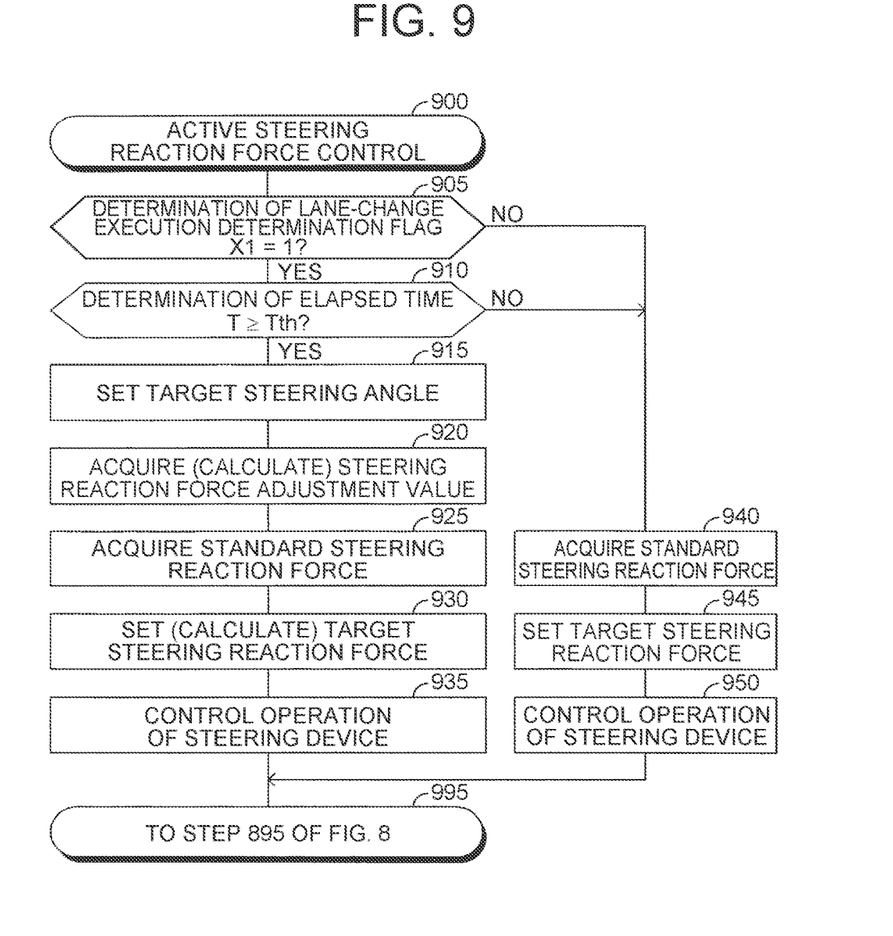
FIG. 9 is a flowchart showing a routine executed by the vehicle control device according to the embodiment of the present disclosure.

When the CPU determines "Yes" in step 805, the CPU moves to the processing of step 810 and executes the routine shown in FIG. 9. Therefore, when the CPU moves to the processing of step 810, the CPU starts from the processing of step 900 of the routine shown in FIG. 9 and moves to the processing of step 905, where it determines whether the value of a lane-change execution determination flag X1 is "1." The lane-change execution determination flag X1 is a flag showing whether there is a lane-change execution possibility. The value of the lane-change execution determination flag X1 is set to "1" when it is determined that there is a lane-change execution possibility, and is set to "0" when the lane change of the host vehicle 100 is completed after the value is set to "1" or when it is determined that there is no lane-change execution possibility after the value is set to "1."

When the CPU determines "Yes" in step 905, the CPU moves to the processing of step 910 and determines whether the elapsed time T is equal to or longer than the control start time Tstart.

When the CPU determines "Yes" in step 910, the CPU moves to the processing of step 915 and sets the target steering angle θtgt using the look-up table shown in FIG. 5C. Then, the CPU moves to the processing of step 920 and acquires (calculates) the steering reaction force adjustment value RFa based on the target steering angle θtgt set in step 915. Then, the CPU moves to the processing of step 925 and acquires the standard steering reaction force RFb using the look-up table shown in FIG. 5B. Then, the CPU moves to the processing of step 930 and sets the target steering reaction force RFtgt based on the steering reaction force adjustment value RFa acquired in step 920 and the standard steering reaction force RFb acquired in step 925. Then, the CPU moves to the processing of step 935 and controls the operation of the steering device 23 such that a steering reaction force corresponding to the target steering reaction force RFtgt set in step 930 is output from the steering device 23 to the steering wheel 35. Then, the CPU moves to the processing of step 895 of the routine shown in FIG. 8 via step 995 and temporarily ends the processing of this routine.

On the other hand, when the CPU determines "No" in step 905 or step 910, the CPU moves to the processing of step 940 and acquires the standard steering reaction force RFb using the look-up table shown in FIG. 5A. Then, the CPU moves to the processing of step 945 and sets the standard steering reaction force RFb acquired in step 940 as the target steering reaction force RFtgt. Then, the CPU moves to the processing of step 950 and controls the operation of the steering device 23 such that a steering reaction force corresponding to the target steering reaction force RFtgt set in step 945 is output from the steering device 23 to the steering wheel 35. Then, the CPU moves to the processing of step 895 of the routine shown in FIG. 8 via step 995 and temporarily ends the processing of this routine.

Figure 8:
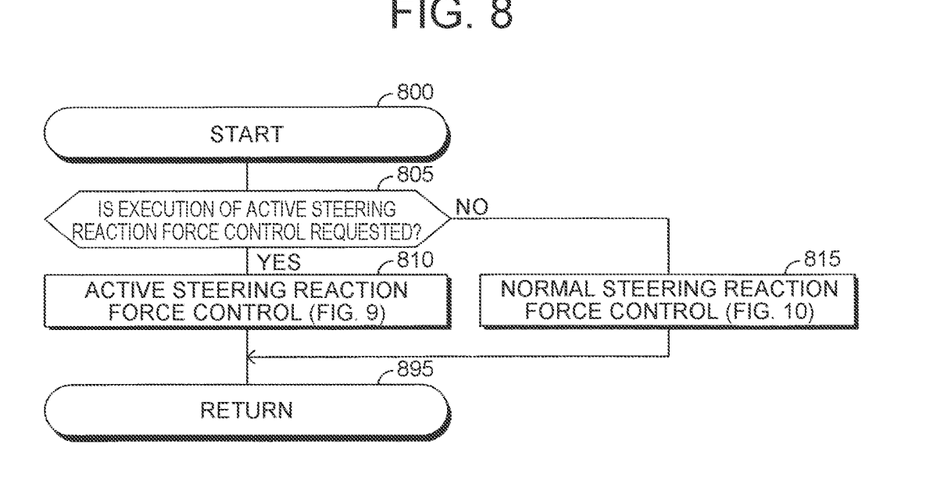
FIG. 8 is a flowchart showing a routine executed by the vehicle control device according to the embodiment of the present disclosure.
Figure 10:
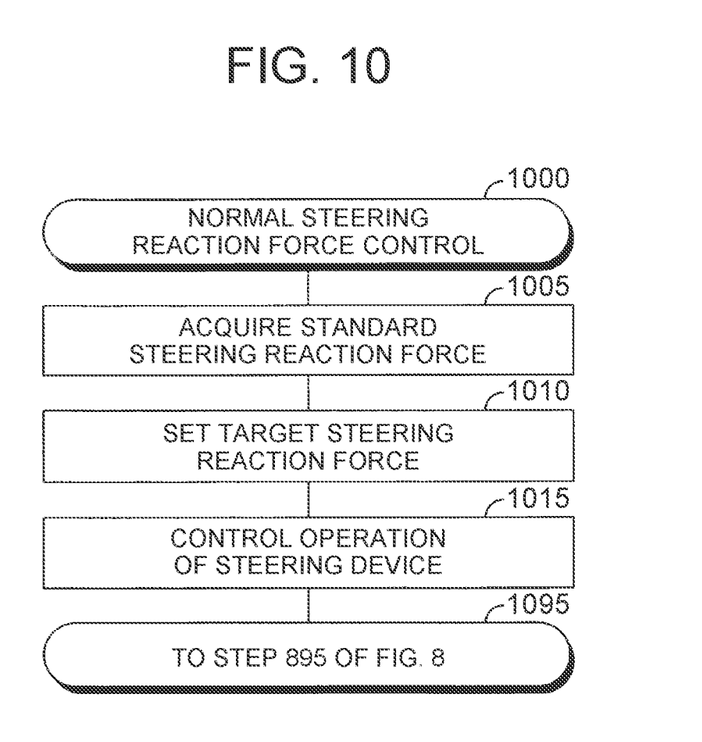
FIG. 10 is a flowchart showing a routine executed by the vehicle control device according to the embodiment of the present disclosure.

When the CPU determines "No" in step 805 of the routine shown in FIG. 8, the CPU moves to the processing of step 815 and executes the routine shown in FIG. 10. Therefore, when the CPU moves to the processing of step 815, the CPU starts from the processing of step 1000 of the routine shown in FIG. 10 and moves to the processing of step 1005, where it acquires the standard steering reaction force RFb using the look-up table shown in FIG. 2. Then, the CPU moves to the processing of step 1010 and sets the standard steering reaction force RFb acquired in step 1005 as the target steering reaction force RFtgt. Then, the CPU moves to the processing of step 1015 and controls the operation of the steering device 23 such that a steering reaction force corresponding to the target steering reaction force RFtgt set in step 1010 is output from the steering device 23 to the steering wheel 35. Then, the CPU moves to the processing of step 895 of the routine shown in FIG. 8 via step 995 and temporarily ends the processing of this routine.

The above is the specific operation of the vehicle control device 10.

The present disclosure is not limited to the above-described embodiment, and various modified examples can be adopted within the scope of the present disclosure.

What is claimed is:

1. A vehicle control device comprising a reaction force generator that gives a steering reaction force to a steering operation performed by a driver on a host vehicle, and a controller that executes steering reaction force control of controlling strength of the steering reaction force,
   the controller being configured to, during execution of the steering reaction force control, give to the steering operation a reaction force that increases as an amount of steering operation becomes larger as the steering reaction force,
   wherein the controller is configured to execute, as the steering reaction force control, active steering reaction force control in which:
   when it is determined that there is no possibility of the driver performing a predetermined steering operation for moving the host vehicle in a lateral direction without involving a change in a final travel direction of the host vehicle, the steering reaction force is set to be greater than a standard reaction force;
   when it is determined that there is a possibility of the driver performing the predetermined steering operation, the steering reaction force is set to be smaller than the standard reaction force; and
   an increase rate of the steering reaction force relative to an increase in the amount of steering operation during a period from a predetermined point in time after it is determined that there is a possibility of the driver performing the predetermined steering operation and before the amount of steering operation in the predetermined steering operation becomes largest is set to be higher than an increase rate of the steering reaction force relative to an increase in the amount of steering operation during a period before the predetermined point in time, and
   wherein the controller is configured such that:
   when it is determined that there is a possibility of the driver performing the predetermined steering operation, the controller sets, as a target steering operation amount, an amount larger than an amount of steering operation that is specified by a pattern of change over time in the amount of steering operation to be achieved by the predetermined steering operation, and when an actual amount of steering operation is smaller than the target steering operation amount, the controller sets a reaction force obtained by reducing the standard reaction force as the steering reaction force and thus sets the steering reaction force to be smaller than the standard reaction force; and from the predetermined point in time, the controller sets, as the target steering operation amount, an amount smaller than the amount of steering operation specified by the pattern of change, and when an actual amount of steering operation is larger than the target steering operation amount, the controller sets a reaction force obtained by increasing the standard reaction force as the steering reaction force, and thus sets the increase rate of the steering reaction force relative to an increase in the amount of steering operation during the period from the predetermined point in time to be higher than the increase rate of the steering reaction force relative to an increase in the amount of steering operation during the period before the predetermined point in time.

2. The vehicle control device according to claim 1, wherein the controller is configured such that:

when it is determined that there is a possibility of the driver performing the predetermined steering operation while execution of the active steering reaction force control is requested by the driver, the controller executes the active steering reaction force control as the steering reaction force control; and when the predetermined steering operation is performed while execution of the active steering reaction force control is not requested by the driver, the controller executes, as the steering reaction force control, normal steering reaction force control in which the amount of steering operation specified by the pattern of change is set as the target steering operation amount, and when an actual amount of steering operation is smaller than the target steering operation amount, the steering reaction force is set to be smaller than the standard reaction force, and when the actual amount of steering operation is larger than the target steering operation amount, the steering reaction force is set to be greater than the standard reaction force.

3. The vehicle control device according to according to claim 1, wherein the steering reaction force is obtained by subtracting a steering adjustment value from the standard reaction force, the steering adjustment value corresponding to a difference between a target steering angle and an actual steering angle.

* * * * *